United States Patent [19]
Galvin et al.

[11] 3,846,778
[45] Nov. 5, 1974

[54] COMBINED ULTRASONIC AND ELECTROMAGNETIC INTRUSION ALARM SYSTEM

[75] Inventors: Aaron A. Galvin, Lexington; L. Dennis Shapiro, Lincoln, both of Mass.

[73] Assignee: Aerospace Research, Inc., Boston, Mass.

[22] Filed: June 21, 1973

[21] Appl. No.: 372,193

[52] U.S. Cl................ 340/258 A, 343/6 R, 343/7.7
[51] Int. Cl........................ G08b 13/16, G08b 13/18
[58] Field of Search .... 340/258 A, 16 R; 343/5 PD, 343/7.7, 6 R

[56] References Cited
UNITED STATES PATENTS
3,665,443  5/1972  Galvin............................. 340/258 A
3,727,216  4/1973  Antonio........................... 340/258 A
3,801,978  4/1974  Gershberg et al................ 343/5 PD Primary Examiner—Glen R. Swann, III
Attorney, Agent, or Firm—Weingarten, Maxham & Schurgin

[57] ABSTRACT

An intrusion alarm system for detecting the presence of moving targets in one or more surveillance zones and in which electromagnetic and ultrasonic signals are simultaneously or alternatively employed with common signal processing circuitry. The electromagnetic and ultrasonic signal frequencies differ from each other in a predetermined ratio such that the wavelengths of the signals being propagated are substantially identical to permit the processing of both received electromagnetic and ultrasonic signals by the common circuitry.

11 Claims, 4 Drawing Figures

PATENTED NOV 5 1974  3,846,778

3,846,778

COMBINED ULTRASONIC AND ELECTROMAGNETIC INTRUSION ALARM SYSTEM

FIELD OF THE INVENTION

This invention relates to intrusion detection systems and more particularly to combined electromagnetic and ultrasonic systems for the detection of a moving target within an area of coverage.

BACKGROUND OF THE INVENTION

Doppler-type intrusion alarm systems are known for detecting the presence of a moving target within an area of coverage and for providing an alarm indication of target presence. Either ultrasonic or electromagnetic signals are transmitted into a protected area and the reflected signals are analyzed to detect the Doppler shifted signals reflected from moving targets. A number of sophisticated ultrasonic systems based on Doppler shifting of the frequency of a received signal by a moving target have been developed incorporating various means for discrimination of true targets from noise or other interfering phenomena. A particularly effective ultrasonic system employing a signal discrimination technique which distinguishes asymmetric signal spectra caused by an actual target from symmetric background signal spectra is disclosed in U.S. Pat. No. 3,665,443, in the name of Aaron A. Galvin and assigned to the same assignee as the present invention.

The detection zone of even the most sensitive ultrasonic detection devices is limited to the confines of the room or other enclosure in which they operate as a result of the inability of sound waves to propagate through walls, floors and other enclosures. The operative range of an ultrasonic system in a relatively large open area is further limited by air attenuation of ultrasonic waves. Although the operating range can be extended by utilizing additional ultrasonic transceivers (transmitter/ receivers) distributed in the protected area, the increased cost of such additional transceivers and interconnecting wiring reduces the applicability of such systems to large or partitioned areas.

The operative zone of electromagnetic motion detection systems is not generally limited by the confines of a room or structure. Since electromagnetic signals are unaffected by air attenuation, the effective range of electromagnetic systems is governable by the power output of the signal transmitter and the sensitivity of the signal discrimination apparatus in the processing circuitry. Electromagnetic systems, particularly those operative at microwave frequencies are characterized by relatively high cost. Since electromagnetic signals can penetrate walls and other barriers, electromagnetic detection systems are often impractical in limited areas, where there is significant danger of false alarms due to detection of motion outside of the area to be protected. Because of this, it is often found desirable to use a combination of electromagnetic and ultrasonic sensors in some installations; the electromagnetic sensors would be used in the large areas, and the ultrasonic sensors would be used in the limited areas of the installations.

Known microwave and radar systems typically employ means for conversion down to zero frequency followed by amplification in the Doppler band, signal processing and alarm circuitry. The Doppler band, being in the low audio and sub-audio range, is affected by Flicker noise, which originates in the conversion device and has a spectrum which is a proportional to inverse frequency and therefore is often referred to as $1/f$ noise. This $1/f$ excess noise limits the allowable post-detection amplification of the system.

SUMMARY OF THE INVENTION

According to the present invention an intrusion alarm system is provided in which electromagnetic and ultrasonic signals are simultaneously or alternatively employed to detect moving targets. By employing ultrasonic and electromagnetic signals having nearly the same wavelength in air, the novel system enables both types of received signals to be simultaneously processed by common signal processing circuitry. The invention advantageously combines the relative wide range and penetration qualities of electromagnetic systems with the defined area coverage of ultrasonic detection systems in a single system at a cost substantially below that of separate ultrasonic and electromagnetic systems particularly when relatively complex low-false alarm-rate processing circuitry is used.

The system provided according to the invention is operative with either ultrasonic or electromagnetic signals alone or with both signals simultaneously being employed, depending on the desired application. Combined ultrasonic and electromagnetic signal detection can be used, for example, to alert a watchman of activity in a given open area, and to provide positive confirmation of entry within a defined protected space within the larger area.

DESCRIPTION OF THE DRAWINGS

The invention will be more fully understood from the following detailed description taken in conjunction with the accompanying drawings in which.

DETAILED DESCRIPTION OF THE INVENTION

Figure 1:
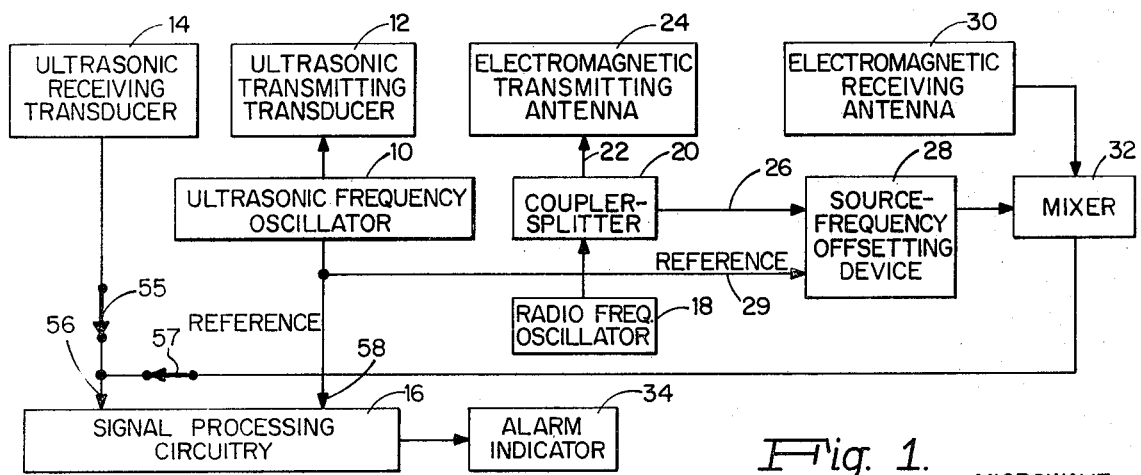
FIG. 1 is a block diagram of an electromagnetic-ultrasonic alarm system according to the invention.

A system constructed and operative according to the invention is illustrated in FIG. 1. An oscillator 10, typically operative at a frequency of on the order of 25 KHz, drives an ultrasonic transmitting transducer 12 which transmits ultrasonic energy into a predetermined ultrasonic detection zone. An ultrasonic receiving transducer 14 receives back-scattered ultrasonic energy from the ultrasonic detection zone and provides a signal to signal processing circuitry 16, which also receives a local oscillator signal from oscillator 10. A second oscillator 18, typically operative at a frequency of 22 GHz, provides a signal to a coupler-splitter 20 which, in turn, provides two outputs. One output 22 drives an electromagnetic transmitting antenna 24 which transmits electromagnetic energy into a predetermined electromagnetic detection zone. The other output 26 from the coupler-splitter provides a reference signal to a source-frequency offsetting device 28, which also receives a signal 29 from oscillator 10. An electromagnetic receiving antenna 30 receives backscattered electromagnetic energy from the second detection zone and provides a signal to a mixer 32 which also receives the output signal from source-frequency offsetting device 28. The output of mixer 32 is provided as an input signal 56, together with the signal from transducer 14, to signal processing circuitry 16. The signal processing circuitry provides an output signal which activates an alarm indicator 34 upon target detection. Thus, the system as outlined above provides an intrusion alarm employing ultrasonic and electromagnetic signals and common signal processing circuitry.

Typically, the electromagnetic detection zone can be considerably larger than the ultrasonic detection zone due to the attenuation of ultrasonic signals in air and the inability of ultrasonic signals to penetrate walls and other partitions. Depending on the placement of the ultrasonic and electromagnetic transmitting and receiving transducers, the electromagnetic detection zone may overlap the ultrasonic detection zone or alternatively the electromagnetic detection zone may be entirely separated from the ultrasonic detection zone. The dimensions of both the electromagnetic and the ultrasonic detection zones may be predetermined and adjusted so as to conform to the surveillance requirements of the user and the zones may include one or more spaced sub-zones, such as separate rooms, or interior and exterior regions. Furthermore, the system constructed according to the present invention may be operated in either of three modes: ultrasonic transmission only, electromagnetic transmission only and combined ultrasonic and electromagnetic transmission. In addition, one signal processor can be used to process the outputs of several ultrasonic and electromagnetic subsystems in very large installations. The operative mode of the system may be selected by suitable controls such as manually or automatically operative switches. Referring to FIG. 1, normally closed switches 55 and 57 are shown, as an example, connected between signal processing circuitry 16 and transducer 14 and mixer 32, respectively. Employing such a switch configuration, switch 55 may be open for electromagnetic transmission only; switch 57 may be open for ultrasonic transmission only or both switches may be closed for combined ultrasonic and electromagnetic transmission. Alternatively, switches may be incorporated at different points in the circuit to effect the desired operating mode variations.

The present invention recognizes and makes use of a particular feature of electromagnetic and sound waves propagating in air; namely, that such waves can each have the same wavelength while being widely separated in frequency. The relationship between wavelength and velocity of propagation is commonly expressed by the formula $\lambda = V/f$ where $\lambda$ is wavelength, $V$ is velocity and $f$ is frequency. The velocity of an electromagnetic signal in air is approximately $3.0 \times 10^{10}$ cm/sec., while the velocity of sound in air is approximately $3.4 \times 10^4$ cm/sec. Thus, the ratio of the propagation velocities in air of electromagnetic signals to sound signals is approximately $0.872 \times 10^6$. Thus, if an electromagnetic signal has a frequency greater than that of a sound signal by a factor of somewhat less than $10^6$, the wavelengths of the signals will be nearly identical.

The Doppler shift ($\Delta f$) in frequency of signals returned from a moving target is given to a first order by the expression $\Delta f = 2 V_o/\lambda$ where $V_o$ is the radial target velocity with respect to the transmitting transducer. Thus, the Doppler shift in a signal reflected from a moving target is nearly identical for ultrasonic and electromagnetic signals having nearly the same wavelengths in air. It is therefore evident that electromagnetic signals and ultrasonic signals may be simultaneously employed for detection purposes and the resulting Doppler information processed by common signal processing apparatus, if signals having the required frequency relationship are employed.

In order to utilize common signal processing apparatus such as that shown in FIG. 1, it is necessary to provide inputs having substantially the same frequency to the signal processing circuitry. In the embodiment shown herein the electrical signal from receiving antenna 30 is frequency shifted in mixer 32 to a frequency common with the electrical signal from ultrasonic transducer 14; i.e., a frequency equal to the ultrasonic transmitted frequency with a bandwidth sufficient to accommodate the full expected range of positive and negative Doppler frequencies, by an offset signal provided by a source-frequency offsetting device 28. Alternatively, the electrical signal from ultrasonic receiving transducer 14 may be frequency-shifted upward to a frequency characteristic of the electromagnetic frequency. In a further alternative embodiment, the electrical signals from both the ultrasonic receiving transducer 14 and the electromagnetic receiving antenna 30 may both be shifted to a common intermediate frequency before being introduced into the signal processing circuitry 16.

Figure 2:
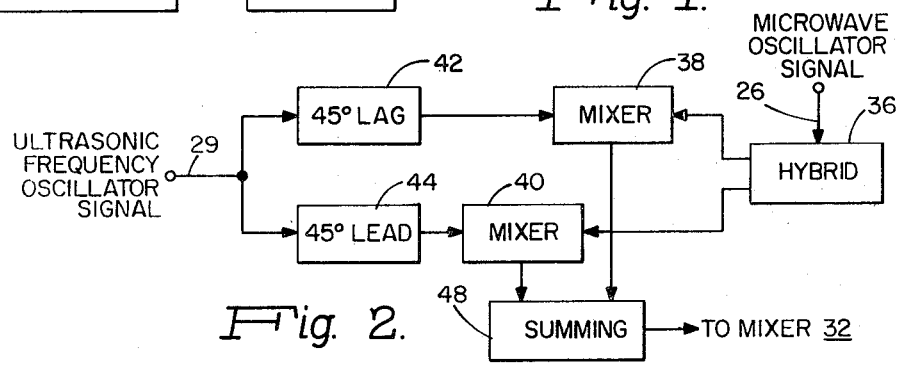
FIG. 2 is a block diagram of one embodiment of a source-frequency offsetting device according to the invention.

A typical embodiment of source-frequency offsetting device 28 is shown in FIG. 2. The continuous wave oscillator signal 26 typically of microwave frequency is supplied by the coupler-splitter 20 (FIG. 1) through hybrid 36 to mixers 38 and 40 which also receive respective signals from lag network 42 and lead network 44. Networks 42 and 44 are driven by a reference signal 29 from oscillator 10 and provide quadrature driving of mixers 38 and 40. The output signals of mixers 38 and 40 are combined by summing circuit 48. The summed output of the mixers is an ultrasonic frequency shifted microwave signal which can be utilized as a local oscillator signal.

Figure 3:
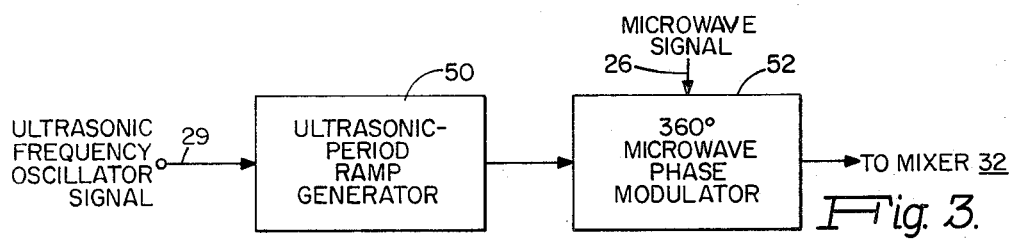
FIG. 3 is a block diagram of another embodiment of a source-frequency offsetting device according to the invention.

An alternative structure for a source-frequency offsetting device 28 is illustrated in FIG. 3. An ultrasonic frequency continuous wave signal 29 from oscillator 10 (FIG. 1) drives a ramp generator 50 which produces an ultrasonic-period ramp signal starting at each positive zero axis crossing of the continuous wave input signal. The ramp signal is applied to a 360° microwave phase modulator 52, together with a microwave signal 26 provided by coupler-splitter 20 (FIG. 1). The phase modulator 52 introduces one extra microwave cycle every ultrasonic period, thereby producing a microwave output signal for mixer 32 which is offset positively by the ultrasonic frequency. Alternatively, a negative offset frequency can be produced by sweeping towards an increased phase, thus removing one microwave cycle every ultrasonic period. The phase modulation can be accomplished by using any one of a number of known electronically controlled phase shifters. One effective technique is described in "360° Varactor Linear Phase Modulator", *IEEE Transactions on Microwave Theory*

*Techniques*, Vol. MTT-17, No. 3, March, 1969. The apparatus shown in FIG. 3 overcomes the need for the pair of carefully-balanced, expensive microwave mixers of the source-frequency offsetting device illustrated in FIG. 2 and is therefore preferred.

Figure 4:
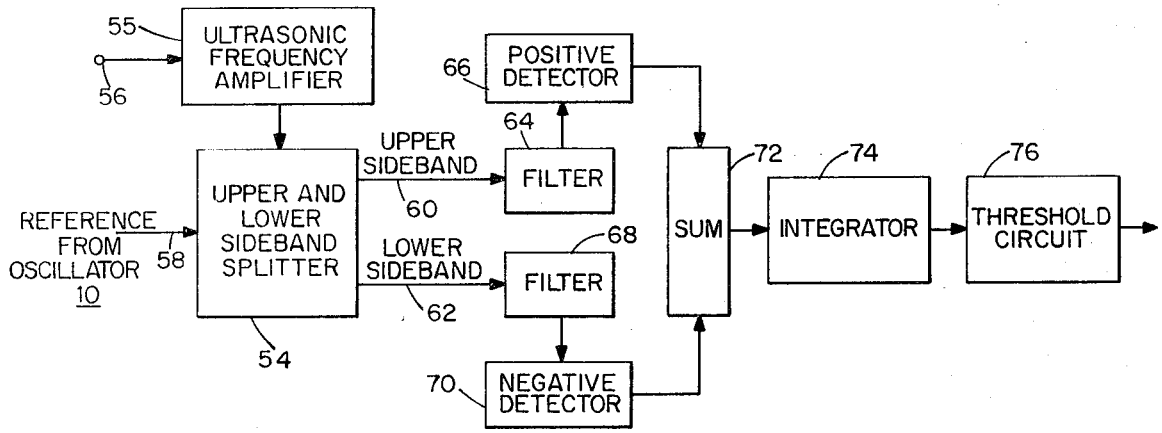
FIG. 4 is a block diagram of a typical embodiment of common signal processing circuitry useful in the invention.

The common signal processing circuitry 16 is implemented in typical embodiment as shown in FIG. 4. This circuitry is itself described in the above-mentioned U.S. Pat. No. 3,665,443. An upper and lower sideband splitter 54 receives a combined input 56 from ultrasonic receiving transducer 14 and mixer 32, after ultrasonic-frequency amplification in amplifier 55, and a reference signal 58 from oscillator 10. The use of ultrasonic-frequency amplification before the baseband down conversion process provided by the sideband splitter avoids most of the flicker noise inherent in the microwave mixer 32. The sideband splitter 54 provides two outputs, one output 60 providing energy if a return signal contains components above the carrier frequency, while the other output 62 provides energy if the return signal appears below the carrier frequency. In essence, sideband splitter 54 provides two baseband down converted output signals representative of the upper and lower sidebands, respectively, of electrical signals 56 from ultrasonic receiving transducer 14 and mixer 32. Output 60 is coupled to a filter 64 which, in turn, is coupled to a detector 66. Output 62 is coupled to a filter 68 which is coupled to a detector 70. Detector 66 is operative to produce a positive full wave rectified output representation of the input signal from filter 64, while detector 70 is operative to produce a negative full wave rectified output representation of the input signal from filter 68. The positive and negative output signals of representative detectors 66 and 70 are applied to a summing circuit 72, the output of which is coupled to an integrator 74. Integrator 74 is operative to drive a threshold circuit 76 for triggering a suitable alarm indicator 34.

One or the other of detectors 66 and 70 will provide an output signal in the presence of a moving target. Detector 66 will provide a positive rectified output signal in the presence of a target having a component of motion moving toward the transmitter, while detector 70 will provide a negative rectified output signal in the presence of a target having a component of motion moving away from the transmitter. By reason of the substantially balanced spectrum caused by interfering phenomena, in contrast to the unbalanced spectrum caused by a moving target, detectors 66 and 70 will both provide output signals in the presence of such interfering phenomena and such signals will substantially cancel in the combination of summing circuit 72 and integrator 74.

Thus, in the presence of interfering phenomena in either the ultrasonic or electromagnetic detection zone, a substantially zero signal is provided by integrator circuit 74 and no alarm condition is sensed. When, however, a moving target is detected, integrator circuit 74 will provide a positive or negative output signal to threshold circuit 76 which is operative to energize an alarm indicator 34 in the presence of an input signal which exceeds a predetermined threshold level.

Other signal processing apparatus may equally well be employed herein for processing of the Doppler signals. Examples of other suitable signal processing circuitry useful in the present invention are shown in the above U.S. Pat. No. 3,665,443, and in applicant's co-pending application Ser. No. 225,049. Various modifications and alternative implementations of the invention will occur to those versed in the art without departing from the spirit and true scope of the invention. Accordingly, it is not intended to limit the invention by what has been particularly shown and described except as indicated in the appended claims.

What is claimed is:

1. An intrusion alarm system comprising:
 means for transmitting an electromagnetic signal of first frequency into a zone under surveillance;
 means for transmitting an ultrasonic signal of second frequency into a zone under surveillance, said electromagnetic and ultrasonic signals being related in frequency to have substantially the same wavelengths in air;
 means operative to receive electromagnetic signals returned from a surveillance zone and to provide a first electrical signal in response thereto;
 means operative to receive ultrasonic signals returned from a surveillance zone and to provide a second electrical signal in response thereto;
 frequency shifting means operative in response to at least one of said first and second electrical signals to provide electrical signals of a common frequency;
 common signal processing means operative in response to said common frequency electrical signals to provide an output signal in the presence of a valid moving target and including means for establishing a threshold representative of the steadystate condition of the surveillance zones in the absence of a valid moving target; and
 means operative to provide an alarm indication in response to exceedance of said threshold by said output signal.

2. An intrusion alarm system according to claim 1 wherein said frequency-shifting means comprises:
 first signal source means operative to provide a first signal having said first frequency;
 second signal source means operative to provide a second signal having said second frequency, one of said first and second signals having a frequency identical to said common frequency, the other of said first and second signals having a frequency different than said common frequency;
 source-frequency offsetting means operative in response to said common frequency signal and to said other signal to provide an offset signal representative of said other signal and offset by said common frequency; and
 mixing means operative in response to said offset signal and to at least one of said first and second electrical signals to provide said common frequency electrical signals representative of said first and second electrical signals.

3. An intrusion alarm system according to claim 1 wherein said first frequency is within the microwave range.

4. An intrusion alarm system according to claim 1 wherein said common frequency is equal to said second frequency.

5. An intrusion detection system comprising:
 means for transmitting an electromagnetic signal of first frequency into a zone under surveillance;
 means for transmitting an ultrasonic signal of second frequency into a zone under surveillance, said electromagnetic and ultrasonic signals being related in frequency to have substantially the same wavelengths in air;

means operative to receive electromagnetic signals returned from a surveillance zone and to provide a first electrical signal in response thereto and containing Doppler information in the presence of a moving target in a surveillance zone;

means operative to receive ultrasonic signals returned from a surveillance zone and to provide a second electrical signal in response thereto and containing Doppler information in the presence of a moving target in a surveillance zone; and frequency shifting means operative in response to at least one of said first and second electrical signals to provide electrical signals of a common frequency and containing said Doppler information, said common frequency signal being suitable for processing by common signal processing circuitry capable of providing an output indication of a moving target.

6. An intrusion alarm system comprising:

means for transmitting an electromagnetic signal of first frequency into a first zone under surveillance;

means for transmitting an ultrasonic signal of second frequency into a second zone under surveillance, said electromagnetic and ultrasonic signals being related in frequency to have substantially the same wavelengths in air;

means operative to receive electromagnetic signals returned from said first surveillance zone and to provide a first electrical signal in response thereto;

means operative to receive ultrasonic signals returned from said second surveillance zone and to provide a second electrical signal in response thereto;

frequency shifting means operative in response to at least one of said first and second electrical signals to provide electrical signals of a common frequency;

common signal processing means operative in response to said common frequency electrical signals to provide an output signal in the presence of a valid moving target and including means for establishing a threshold representative of the steady state condition of said first and second surveillance zones in the absence of a valid moving target; and means operative to provide an alarm indication in response to exceedence of said threshold by said output signal.

7. An intrusion alarm system according to claim 6 wherein said first and second surveillance zones are conterminous.

8. An intrusion alarm system according to claim 7 wherein the first surveillance zone extends beyond said second surveillance zone.

9. An intrusion alarm system according to claim 7 wherein said first surveillance zone is separate from said second surveillance zone.

10. An intrusion alarm according to claim 2 wherein said source-frequency offsetting means includes a lead and lag network receiving said common frequency signal and providing output signals, mixers receiving the output signals from said lead and lag network and said other signal, and a summing circuit receiving the output from the mixers and providing said offset signal.

11. An intrusion alarm system according to claim 2 wherein said source-frequency offsetting means includes a ramp generator receiving said common frequency signal and a microwave phase modulator receiving the output of said ramp generator and said other signal and providing said offset signal.

* * * * *